Figure 1:
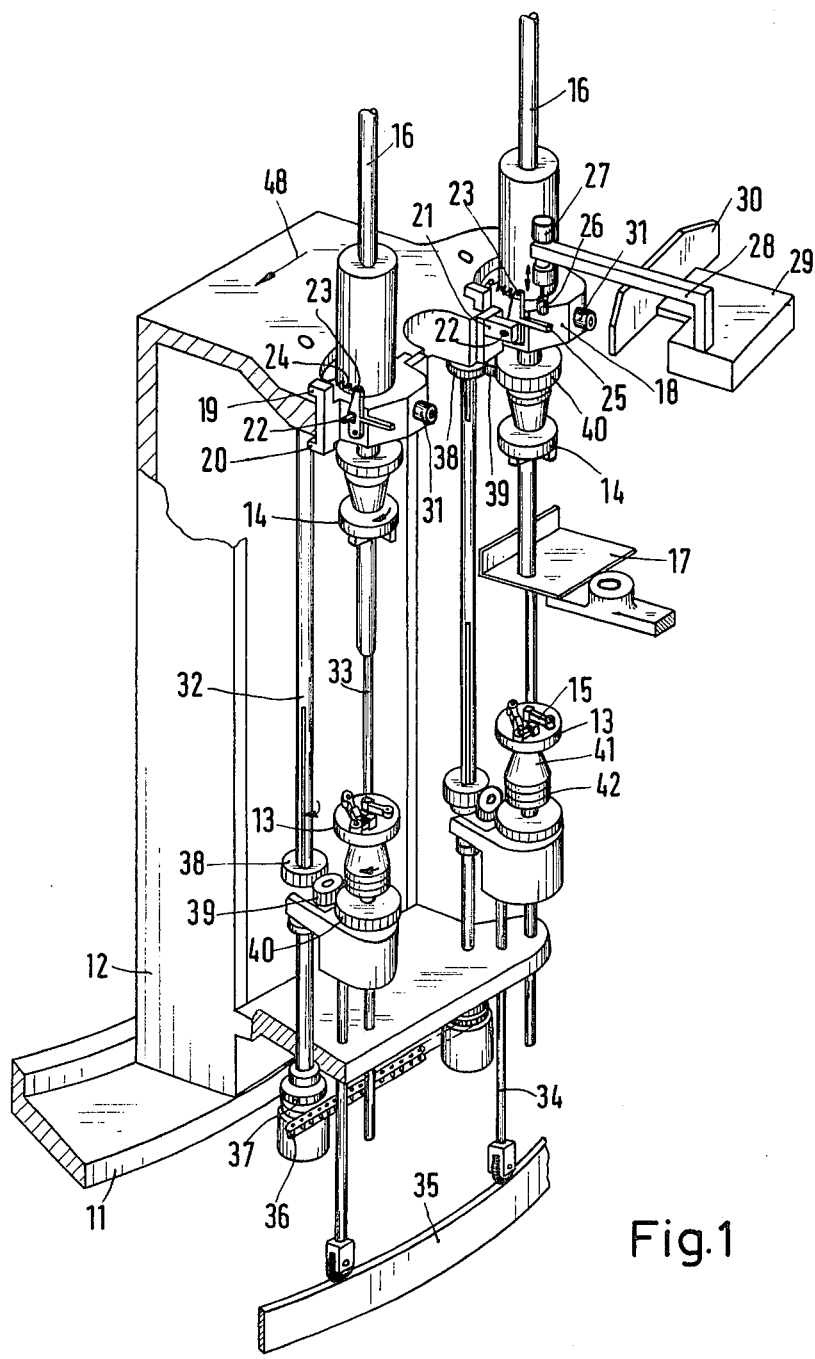

United States Patent [19]

Dichter

[11] 4,092,142
[45] May 30, 1978

[54] MACHINE FOR MAKING CONTAINERS FROM GLASS TUBES

[76] Inventor: Hans-Joachim Dichter, Berlin, Germany

[21] Appl. No.: 758,934

[22] Filed: Jan. 13, 1977

[30] Foreign Application Priority Data

Jan. 23, 1976 Germany .............................. 2602944

[51] Int. Cl.² .............................................. C03B 23/12
[52] U.S. Cl. ....................................... 65/159; 65/227; 65/276; 65/280
[58] Field of Search .................. 65/227, 323, 159, 276, 65/280; 221/11, 83, 105

[56] References Cited

U.S. PATENT DOCUMENTS 2,961,800  11/1960  Bates ................................... 65/227 X Primary Examiner—Arthur D. Kellogg
Attorney, Agent, or Firm—Haynes N. Johnson

[57] ABSTRACT

The invention relates to a machine for making containers from glass tubes, with several chucks circulating through a succession of processing stations, each chuck having jaws to grip a glass tube or container, and with the chucks being brought successively to a position in which they are superposed above a stationary supporting plate at at least one processing station, this plate being for limiting downward movement of the length of tube which falls downwards through the chuck, wherein the chucks move up and down on at least one circulating column, the processing station which has the supporting plate being equipped with a senser which triggers a releasing device which releases the chuck which has reached this station, so that it moves downwards, the senser responding to the absence of a tube above the upper surface of the jaws of the chuck by initiating downward movement of the chuck.

8 Claims, 6 Drawing Figures

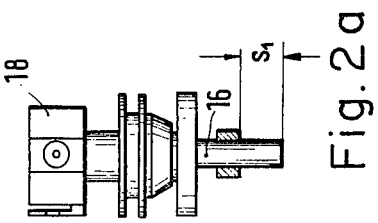
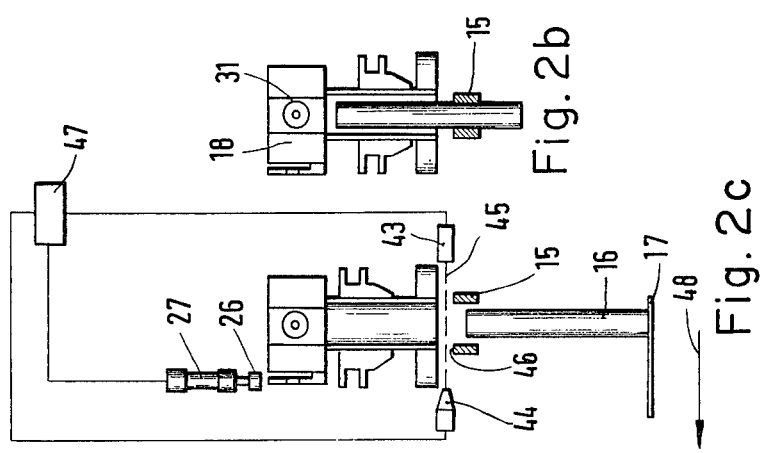
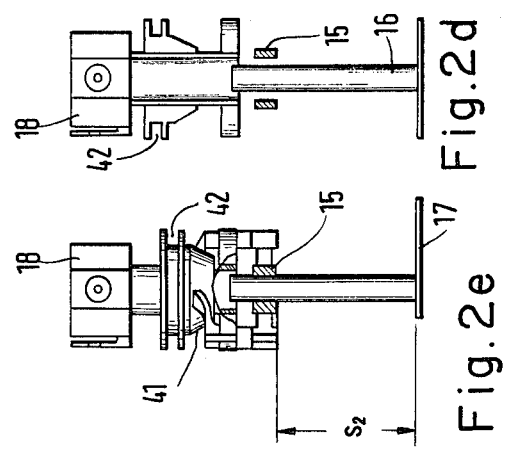

MACHINE FOR MAKING CONTAINERS FROM GLASS TUBES

The invention relates to a machine for processing glass tubes, for example to form containers, the machine having several chucks circulating through a succession of processing stations, each chuck having jaws to grip a glass tube, and with a stationary supporting plate at at least one processing station where it is located beneath a chuck, the plate limiting downwards movement of the tube which falls downwards through the superposed chuck.

Machines of this general kind are known in which the chucks, adapted to be brought to a position where they are superposed above such a supporting plate, are fixed in height (German Patent Specification No. 1,093,519). But these machines have a disadvantage in that it sometimes happens that a short piece of glass tubing is fed into the machine with the result that the chuck does not grip the upper end of the tube properly, that is to say only the lower portions of the chuck jaws can grip the top end of the tube. As a result, the tube is not gripped securely and begins to flail, its lower end swinging in a circle. The tube sometimes breaks off in or near the chuck, which not only wastes material but also distributes broken glass over the machine.

The intention in the present invention is to provide a machine of the kind mentioned at the beginning but in which the tubes are always securely and fully gripped by the jaws of the chuck, which is adapted to be brought into a position superposed above a said supporting plate.

The problem is solved according to the invention in that the chucks adapted to be superposed above a supporting plate move up and down on at least one circulating column, the processing station which has the supporting plate being equipped with a sensor which triggers a device which releases the chuck which has reached this station, so that it is allowed to move downwards, the senser responding to the absence of a tube above the upper surface of the chuck jaws by initiating the said downwards movement of the chuck.

The machine according to the invention has the advantage that when an abnormally short length of tube is fed downwards into the machine, so that the chuck jaws cannot grip the upper end of the tube fully and securely, the chuck is lowered sufficiently to enable its jaws to grip the tube further down, where they can get a secure hold on the tube. This not only saves material but also contributes to the quality of the environment in that glass is not distributed.

The machine according to the invention will now be described in greater detail on the basis of the example represented in the drawing, in which:

FIG. 1 shows a pair of sets of chucks in a glass-working machine, the two sets of chucks being mounted on a column which circulates around past a sequence of processing stations; and FIGS. 2a–2e show diagrammatically an upper chuck in several stages of operation during the feeding of a glass tube.

FIG. 1 shows the annular supporting base 11 of a glass-working machine which has several circulating columns 12 distributed around its periphery, each supporting two lower chucks 13 and two upper chucks 14. Each of the chucks has three jaws 15 for gripping a glass tube 16. A supporting plate is shown at 17, which limits the distance of fall of the glass tube when the upper chuck 14 is opened. The supporting plate 17 is preferably adjustable in height.

Each upper chuck 14 is mounted on a slide 18 which slides up and down through a limited distance in guides in the upper portion of the column 12. The distance of vertical movement of the slide 18 is limited by upper and lower limit stops 19, 20 fixed to the slide. Fixed to the column there is a supporting projection 21 supporting a catch pin 22 which co-operates with a pivoted catch lever 23, which is held in its locking position by a spring 24. The pivoted catch lever 23 has an arm 25 which can be moved by the piston 26 of an actuating cylinder 27 fixed to the end of a stationary arm 28, itself fixed to a stationary part 29 of the glass-working machine. The stationary part 29 also supports an edge cam 30. A roller 31 mounted on the slide 18 can roll along on the edge cam 30.

Each lower chuck 13 moves up and down guided by guide rods 32 and 33, the vertical movements being controlled by rods 34 which roll on a cam rail 35.

The guide rod 32 also drives the upper and lower chucks 13, 14 in rotation, the guide rod 32 being itself driven in rotation by a chain 36 through a sprocket wheel 37. Drive is transmitted to the chucks through toothed pinions 38, 39, 40.

Each chuck is opened and closed by a chuck cone 41 which is lifted and lowered by a chuck-actuating fork (not shown) working in an annular groove 42 in the cone. The movements of the chuck-actuating fork are controlled by cams (also not shown). The openingg and closing of the chucks is described, for example, in the German Patent Specification No. 1,293,971, and need not be described in detail here.

The action of the piston 26, which acts on the arm 25 of the pivoted catch lever 23, will now be described. A senser 43 (FIG. 2) responds to a jet of compressed air issuing from an air nozzle 44. The jet of air travels across above the upper surfaces 46 of the jaws 15 of the upper chuck 14. A delayed control device 47 responds when the air jet has been acting on the senser 43 for a certain length of time. At the end of this period the delayed control device 47 causes the piston 26 to be driven downwards.

The device according to the invention functions as follows: Each chuck, sweeping along in the direction of the arrow 48, approaches the processing station which has the supporting plate 17. At this time the lower portion of the glass tube 16 is projecting only a short distance $s_1$ (FIG. 2a) below the upper chuck 14. Before the workpiece can be processed, this has to be increased to the distance $s_2$ shown in FIG. 2e. When the chuck reaches the supporting plate 17 the chuck jaws 15 open and the glass tube falls down until its lower edge comes to rest on the supporting plate 17, as shown in FIG. 2c. Under these circumstances it can happen that the piece of glass tubing is rather short, with the result that the chuck jaws grip the upper end of the tube by only a portion of their length, as shown at FIG. 2c. If this happens, the senser 43 receives a jet of air from the air nozzle 44. The delayed control device 47 responds by energizing the actuating cylinder 27, which drives the piston 26 downwards so that it strikes the arm 25 (compare FIG. 1) of the pivoted catch lever 23, which therefore pivots clockwise, against the influence of its spring 24, releasing the catch pin 22 so that the slide 18, with the upper chuck 14, moves downwards until stopped by the upper limiting stop 19. In FIG. 1 the limiting stops are represented as a rigid structure, but they can, of course, if desired be made adjustable.

This downward movement of the slide 18 brings the chuck jaws 15 down over the upper end of the glass tube 16, as represented in FIG. 2d. The chuck jaws can now grip the upper end of the glass tube securely. This is efffected by a downwards movement of the chuck cone 41.

Subsequently the chuck, which is now in its lowest limiting position, circulates nearly all the way around the glass-working machine, until it once more approaches the supporting plate 17. Before reaching this, the roller 31 of the slide 18 runs up on the edge cam 30, which lifts the slide 18 until the pivoted catch lever 23, rotating backwards under the influence of its return spring 24, once more engages its catch pin 22, the slide 18 being now back in its normal operating position. By this time the previously fed glass tube has been processed and has left the machine, and a fresh glass tube has been lowered into the chuck until its lower edge has come to rest on the supporting plate 17, as represented in FIG. 1.

I claim:

1. A machine for making containers from glass tubes including several chucks, means for circulating said chucks through a succession of processing stations, each chuck having jaws to grip a glass tube or container, and means for bringing said chucks successively into a position in which they are superposed above a stationary supporting plate at at least one processing station, said plate limiting the downwards movement of the length of tube which falls downwards through said chuck, characterised in that the said chucks move up and down on at least one circulating column, the processing station which has the supporting plate being equipped with a senser which triggers a releasing device said releasing device comprising means for releasing said chuck which has reached said processing station and moving said chuck downwards, said senser responding to the absence of a tube above the upper surface of said jaws of said chuck by actuating said releasing means which initiates said downwards movement of said chuck wherein said chuck moves into a position in which it can securely grip said tube.

2. A machine according to claim 1, characterised in that the distance of downwards movement permitted to the chuck corresponds to the height of the chuck jaws.

3. A machine according to claim 1, characterised in that the processing station equipped with the supporting plate has, upstream of this, an edge cam for lifting a chuck back to its initial position.

4. A machine according to one of the claim 1, characterised in that the releasing device consists of a pivoted catch lever actuated by a piston, and a catch pin which co-operates with the pivoted catch lever.

5. A machine according to claim 4, characterised in that the pivoted catch lever is held in its position locking the chuck by a spring.

6. A machine according to one of the claim 1, characterised in that the senser is air-operated.

7. A machine according to one of the claim 1, characterised in that the chuck is mounted on a slide which can move up and down.

8. A machine according to claim 7, characterised in that the upwards and downwards movement of the slide is limited by limit stops.

* * * * *

UNITED STATES PATENT OFFICE
CERTIFICATE OF CORRECTION

Patent No. 4,092,142         Dated May 30, 1978

Inventor(s) Hans-Joachim Dichter

It is certified that error appears in the above-identified patent and that said Letters Patent are hereby corrected as shown below:

Column 2, Line 31 "openingg" should be -- opening --.

Column 4, Line 18 (Claim 4, Line 1) delete "one of the".

Column 4, Line 26 (Claim 6, Line 1) delete "one of the".

Column 4, Line 28 (Claim 7, Line 1) delete "one of the".

Signed and Sealed this

Twenty-first Day of November 1978

[SEAL]

Attest:

RUTH C. MASON
*Attesting Officer*

DONALD W. BANNER
*Commissioner of Patents and Trademarks*